(12) United States Patent
Jansen

(10) Patent No.: US 6,450,568 B1
(45) Date of Patent: Sep. 17, 2002

(54) OPEN ROOF CONSTRUCTION FOR A VEHICLE

(75) Inventor: Carlo Jansen, Vierlingsbeek (NL)

(73) Assignee: Inalfa Industries B.V. (NL)

( * ) Notice: Subject to any disclaimer, the term of this patent is extended or adjusted under 35 U.S.C. 154(b) by 0 days.

(21) Appl. No.: 09/886,458

(22) Filed: Jun. 21, 2001

(30) Foreign Application Priority Data

Jun. 21, 2000 (NL) .............................................. 1015492

(51) Int. Cl.$^7$ ................................................. B60J 7/22
(52) U.S. Cl. ...................................................... 296/217
(58) Field of Search ......................................... 296/217

(56) References Cited

U.S. PATENT DOCUMENTS

| | | | |
|---|---|---|---|
| 5,031,959 A | 7/1991 | Queveau | 296/223 |
| 5,833,305 A | 11/1998 | Watzlawick et al. | 296/217 |
| 6,086,146 A * | 7/2000 | Nabuurs | 296/217 |

FOREIGN PATENT DOCUMENTS

| | | | |
|---|---|---|---|
| DE | 2522035 | * 11/1976 | 296/217 |
| DE | 197 32 699 A | 2/1999 | |
| GB | 747081 | * 3/1956 | 296/217 |

* cited by examiner

*Primary Examiner*—Dennis H. Pedder
(74) *Attorney, Agent, or Firm*—Westman, Champlin & Kelly, P.A.; S. Koehler

(57) ABSTRACT

There is disclosed an open roof construction for a vehicle, comprising a roof opening formed in the roof of the vehicle, which can be closed by means of at least one closure element which can be moved forward and backward between an open position and a closed position. A flow-influencing flap is mounted at a location of a part of the open roof construction which co-operates with a front edge of the closure element in the closed position of said closure element. The flap is pivotable about a pivot pin extending substantially transversely to the longitudinal axis of the vehicle, between a first position, in which it extends substantially parallel to the local air flow, and a second position, in which it extends at an angle with respect to the local air flow, wherein pivoting of the flap is prevented in the closed position of the closure element, while pivoting of the flap to a second position, under the influence of the local air flow, is possible in the open position of the closure element.

11 Claims, 2 Drawing Sheets

OPEN ROOF CONSTRUCTION FOR A VEHICLE

BACKGROUND OF THE INVENTION

The invention relates to an open roof construction for a vehicle, comprising a roof opening formed in the roof of the vehicle, which can be closed by at least one closure element which can be moved forward and backward between an open position and a closed position.

With an open roof construction of the type to which the present invention relates, undesirable entry of wind into the opened roof opening forms a major problem. In the past, attempts have been made to prevent or at least minimize such wind entry.

SUMMARY OF THE INVENTION

It is an object of the present invention to provide a new way of preventing or at least minimizing such wind entry.

In order to accomplish that objective, the open roof construction according to the invention includes a flow-influencing flap mounted at a location of a part of the open roof construction which co-operates with a front edge of a closure element in the closed position of said closure element, which flap is pivotable about a pivot pin extending substantially transversely to the longitudinal axis (front to rear) of the vehicle, between a first position, in which it extends substantially parallel to the local air flow, and a second position, in which it extends at an angle with respect to the local air flow. Pivoting of the flap is prevented when the closure element is in a closed position, while pivoting of the flap to the second position, under the influence of the local air flow, is possible when the closure element is in an open position.

In the closed position of the closure element, said flap extends substantially parallel to the local air flow. This means that the flap does not encounter any appreciable resistance in this position, and that it hardly influences the air flow round the vehicle roof, if at all. As a matter of fact, such influencing of the flow is not necessary in this position, since the roof opening is closed by the closure element and wind entry is not possible. When the closure element has been moved to an open position, on the other hand, and the roof opening is open, the flap can pivot about its pivot pin to the second position, in which it extends at an angle with respect to the local air flow. As a result, the air flow is influenced in such a way that there is hardly any entry of wind into the open roof opening, if at all. Said pivoting of the flap to the second position takes place under the influence of the aforesaid local air flow. This means that such pivoting of the flap will thus occur only when there is a sufficiently strong local air flow. When the vehicle is stationary, for example, there is no such air flow, and the flap will take up the first position. Only when the vehicle starts to move will the flap be caused to pivot under the influence of the local air flow that occurs at that point in time.

The moment at which pivoting of the flap from the first position to the second takes place depends on various factors. The force of the local air flow plays a significant role, of course. In addition, the dimensions and the shape of the flap are important in this connection, as well as its location relative to the roof.

The co-operation between the local air flow and the flap can be realized in various ways. In accordance with a preferred embodiment of the open roof construction according to the invention, the flap thus comprises a part extending in front of the pivot pin, seen in the longitudinal direction of the vehicle, which part is in contact with the air flow and which, in the second position, extends at a positive angle with respect to the local flow at that location.

The result of the air flow acting on such a part extending in front of the pivot pin is that an angle of contact, once obtained, tends to become larger, so that the flap is automatically moved to the second position.

In this connection, it may furthermore be advantageous if the flap is provided with an inlet opening for the air flow at its front end, seen in the longitudinal direction of the vehicle. Such an inlet opening can be conducive to the cooperation between the air flow and the flap with a view to initiating the pivoting movement of the flap.

In another embodiment of the open roof construction according to the invention, the flap is fitted with a spring member, which loads the flap towards the first position. Such a spring member ensures that the flap will take up the first position, and remain in this position, for example when the vehicle is stationary or moving at a low speed. Uncontrolled vibration of the flap is prevented in a reliable manner under these circumstances. In that case the spring force (spring constant) determines the moment (force of the local flow) at which pivoting of the flap becomes possible.

Such a spring member may be a torsion spring acting round the pivot pin. Other constructional solutions are possible, however.

Furthermore, it is possible that the pivoting of the flap from the first position to the second position takes place upon exceeding a value of the air flow, which is higher than the value below which the air flow must decrease before the flap returns to the first position. This gives the flap a so-called hysteresis effect, thus preventing the flap from pivoting to and fro between the aforesaid two positions at certain limiting values, which is objectionable.

According to another embodiment, the flap is accommodated in a recess in the respective part of the open roof construction in its first position. On the one hand the aerodynamics of the open roof construction are optimized in this manner, while on the other hand it is possible to pay attention to the aesthetic aspect of the vehicle.

The flap can be mounted at various places. It is possible, for example, to mount the flap on the fixed roof of the vehicle, that is, at the front edge of the roof opening. In that case, the flap co-operates with the front edge of said closure element in the closed position of said closure element, and pivoting of the flap to the second position is possible only when the closure element is at least partially open.

It is also possible, however, to mount the flap on another part of the open roof construction, for example on a pivotable wind deflector. Such a pivotable wind deflector, which is known per se, will have said flap mounted on its free rear edge in that case. Pivoting of the flap is only possible once the rear edge of the wind deflector is no longer in contact with the front edge of the closure element. Such a situation can occur in several ways. The wind deflector itself may still be in its closed position, while the closure element is at least partially open. It is also possible for the closure element to be closed, while the wind deflector is at least partially open. In addition, both the wind deflector and closure element may be at least partially open.

According to another embodiment, the flap includes a part, which extends beyond the pivot pin. On the one hand such a part can perform a function in balancing the flap, but on the other hand such a part can also be used for engaging, in the first position of the flap, a closure element occupying its closed position. In that case the part in question functions to lock the flap in position.

BRIEF DESCRIPTION OF THE DRAWINGS

The invention will now be explained in more detail with reference to the drawings, which show a number of exemplary embodiments of the open roof construction according to the invention.

DETAILED DESCRIPTION OF THE ILLUSTRATIVE EMBODIMENTS

Figure 1:
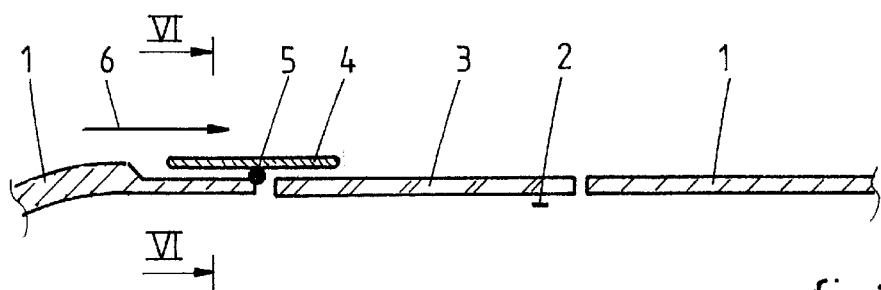
FIG. 1 is a schematic, longitudinal sectional view of a first embodiment of the open roof construction according to the invention, showing a first position thereof.
Figure 2:
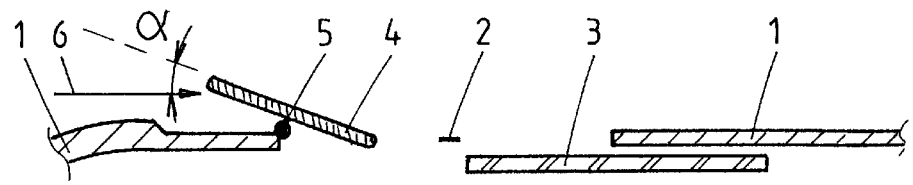
FIG. 2 shows a second position of the embodiment of FIG. 1.

FIG. 1 illustrates a part of a fixed roof 1 of a vehicle. A roof opening 2 is formed in said roof 1, which opening can be closed by a closure element 3. Said closure element 3 can be moved forward and backward between a closed position (FIG. 1) and an open position (FIG. 2).

A flap 4 is mounted on roof 1 at a front edge of the roof opening 2. Flap 4 is capable of pivoting movement about a pivot pin 5, which extends substantially transversely to the longitudinal axis of the vehicle. Said flap can be pivoted between a first position (FIG. 1), in which it extends substantially parallel to local air flow 6, and a second position (FIG. 2), in which it extends at a position or at an angle (herein, acute) to local air flow 6 or the first position.

Such pivoting takes place under the influence of the local air flow 6, which acts on a part of flap 4 that extends in front of pivot pin 5 in the illustrated embodiment. When the vehicle is stationary or moving at a low speed, flap 4 will take up a position as shown in FIG. 1, therefore.

Figure 7:
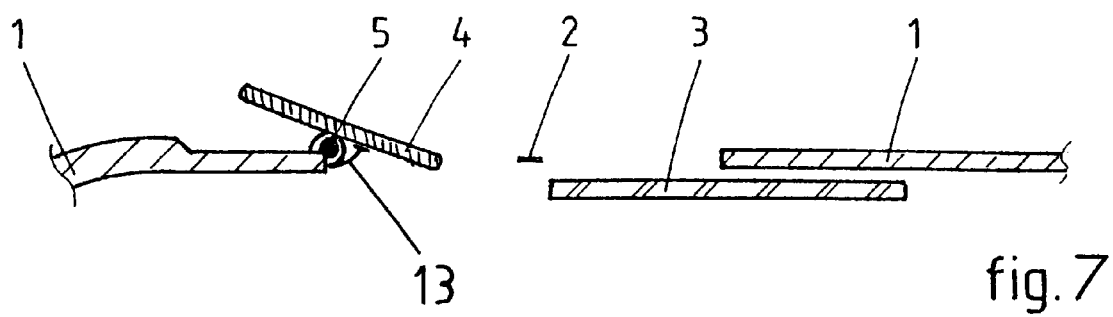
FIG. 7 is an enlarged view of a portion of FIG. 4, including a schematic representation of a torsion spring.

Referring to FIG. 7, spring member 13 can be used to load the flap 4 to the first position that is shown in FIG. 1. In one embodiment, the spring member can comprise a torsion spring (schematically illustrated in FIG. 7); however as appreciated by those skilled in the art, other types of spring members (e.g. tension or compression) or other devices for providing a restoring force can be used between flap 4 and parts of the roof construction to bias the flap 4 to the first position. In such a case, air flow 6 must first overcome the force of said spring member 13 before the flap 4 pivots to the position that is shown in FIG. 2.

In the position of flap 4 that is shown in FIG. 2, said flap 4 extends at a positive angle a with respect to the local air flow 6. This means that pivoting of flap 4 will take place automatically under the influence of the air flow 6.

Since the illustrated flap 4, as already said before, also includes a part separate from a major air influencing surface, which extends beyond, on the other side of pivot pin 5 (seen in the longitudinal direction of the vehicle), pivoting of flap 4 is prevented in the position that is shown in FIG. 1, since said part is adapted to be in contact with the closure element 3 in that position. Unimpeded pivoting of flap 4 is not possible until closure element 3 has released the roof opening at least partially (FIG. 2).

While flap 4 is mounted on a fixed part of the roof 1 in the embodiment according to FIGS. 1 and 2, FIGS. 3 and 5 show an alternative embodiment, wherein a flap 7 is pivotally connected to the rear end of a wind deflector 8 that is known per se, and therefore is only schematically illustrated. Also this embodiment comprises a roof 1 having a roof opening 2 formed therein, which opening 2 can be closed by a closure element 3 which can be moved forward and backward (and also by the wind deflector 8).

Figure 3:
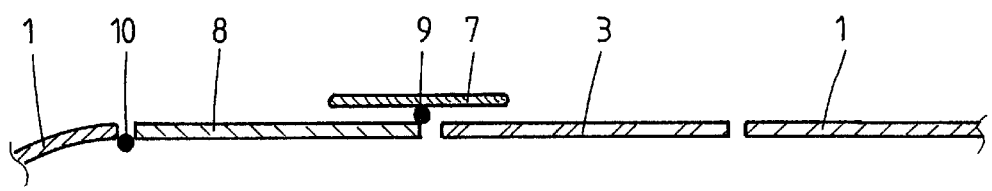
FIG. 3 shows a second embodiment of the open roof construction according to the invention in a first position thereof.
Figure 4:
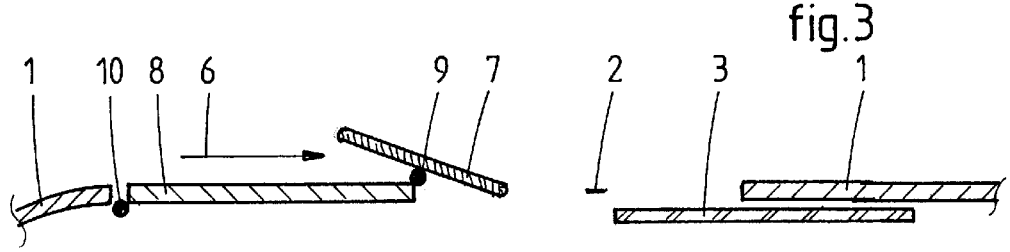
FIG. 4 shows the embodiment of FIG. 3 in a second position thereof.
Figure 5:
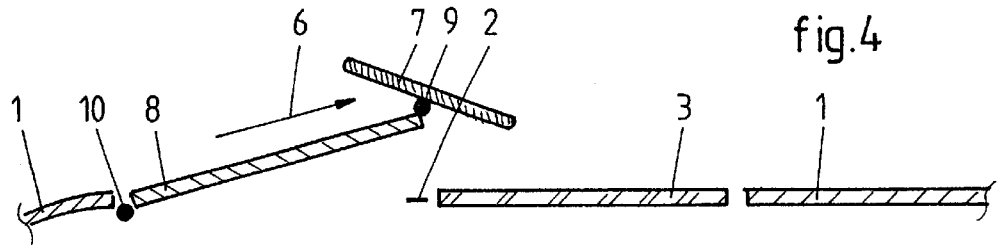
FIG. 5 shows the embodiment of FIG. 3 in a third position thereof.

In the situation illustrated in FIG. 3, the roof opening 2 is completely closed, and flap 7 cannot pivot about a pivot pin 9 because a rear part of flap 7 would be stopped by closure element 3 upon doing so. Only when the closure element 3 is no longer present in the immediate vicinity of flap 7, can flap 7 move to a position in which it extends at an angle to the local air flow 6. Such a situation occurs, for example, when the closure element 3 has been moved to an open position (FIG. 4). Wind deflector 8 still takes up its original position in this situation. It is also possible, however, for closure element 3 to maintain its original, closed position, while wind deflector 8 is pivoted outwards about a pivot pin 10 (FIG. 5). Pivoting movement of flap 7 about pivot pin 9 is possible in this situation as well.

Figure 6:
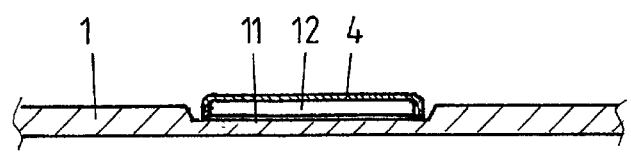
FIG. 6 is a schematic, sectional view along line VI—VI in FIG. 1.

FIG. 6 is a schematic, sectional view along line VI—VI in FIG. 1. This sectional view clearly shows that flap 4 can be accommodated in a recess 11 in roof 1. In this manner, a continuous contour of the roof is obtained in the first position of flap 4, which is advantageous from an aerodynamic and aesthetic viewpoint. The sectional view according to FIG. 6 furthermore shows that the flap 4 is provided with an inlet opening 12 for the air flow at its front end, which inlet opening 12 may be of assistance in initiating the pivoting movement of flap 4.

In the closed position of the roof opening 2, or also in the open position of the roof opening 2, when the vehicle is driving at a low speed, the flap 4 takes up the first position (FIGS. 1 and 3). When the roof opening 2 is opened and the vehicle speed is high enough, pivoting of the flap about the pivot pin in question takes place under the influence of the air flow acting on said flap, to a position in which the flap extends at an angle with respect to the local air flow (FIGS. 2, 4 and 5).

Pivoting of the flap from the first position to the second will not take place until a certain value of the airflow is exceeded (or, in many cases, at a specific speed of the vehicle, ignoring wind effects such as headwinds and the like). In order to prevent situations wherein a very small decrease of said air flow value already causes the flap to return to its first position, and vice versa, the flap may be so designed that it will not return to its first position until the value of the air flow has decreased to a level well below that of the former value. In this way a hysteresis effect is obtained, as it were, which prevents uncontrolled pivoting to and fro (vibrating) of the flap. Aspects suitable for realizing this feature can be implemented in a various ways. For example, aerodynamic facilities may be utilized, which are easy to realize. After all, a specific air flow value is required for initiating the pivoting movement of the flap 4 from the position that is shown in FIG. 1, since the contact area of the flap 4 is relatively small in this position. Once the flap 4 has started to pivot, its contact area increases in an aerodynamic sense, and the force with which the airflow acts on the flap 4 will quickly increase. Consequently, the value of the air flow will have to decrease significantly, due to the increased flap angle, before the flap 4 returns to its original, first position.

The invention is not restricted to the embodiments as described above, which can be varied in several ways without departing from the scope of the invention as defined in the claims.

What is claimed is:

1. An open roof assembly for a vehicle having a roof opening in a fixed roof and a closure element which can be moved forward and backward between an open position and a closed position, the open roof assembly comprising a flow-influencing flap mountable at a location and adapted to co-operate with a front edge of the closure element in the closed position of said closure element, wherein the flap is pivotable about a pivot pin extending substantially transversely to the longitudinal axis of the vehicle, between a first position, in which it extends substantially parallel to the local air flow, and a second position, in which it extends at an angle with respect to the local air flow, wherein the flap moves from the first position to the second position upon sufficient air flow force generated by forward vehicle motion.

2. The open roof assembly according to claim 1, wherein the flap comprises a part extending in front of the pivot pin, seen in the longitudinal direction of the vehicle, wherein the part is in contact with the air flow and wherein, in the second position of the flap, the part extends at an upward angle with respect to the local flow at that location.

3. The open roof assembly according to claim 2, wherein the flap is provided with an inlet opening for the air flow at its front end, seen in the longitudinal direction of the vehicle.

4. The open roof assembly according to claim 1, wherein said flap is fitted with a spring member, which loads the flap towards the first position.

5. The open roof assembly according to claim 4, wherein said spring member is a torsion spring acting round the pivot pin.

6. The open roof assembly according to claim 1, wherein said pivoting of the flap from the first position to the second takes place upon exceeding a value of the air flow which is higher than the value below which the air flow must decrease before the flap returns to the first position.

7. The open roof assembly according to claim 1, wherein the flap is accommodated in a recess in the respective part of the open roof assembly in its first position.

8. The open roof assembly according to claim 1, wherein the flap is mounted on the fixed roof of the vehicle.

9. The open roof assembly according claim 1, and further comprising a pivotable wind deflector, wherein the flap is mounted on the pivotable wind deflector.

10. The open roof assembly according to claim 1, wherein the flap includes a part which extends beyond the pivot pin on a side thereof remote a major air influencing surface.

11. The open roof assembly according to claim 10, wherein the part is adapted to engage a portion of the closure element.

* * * * *